Figure 1:
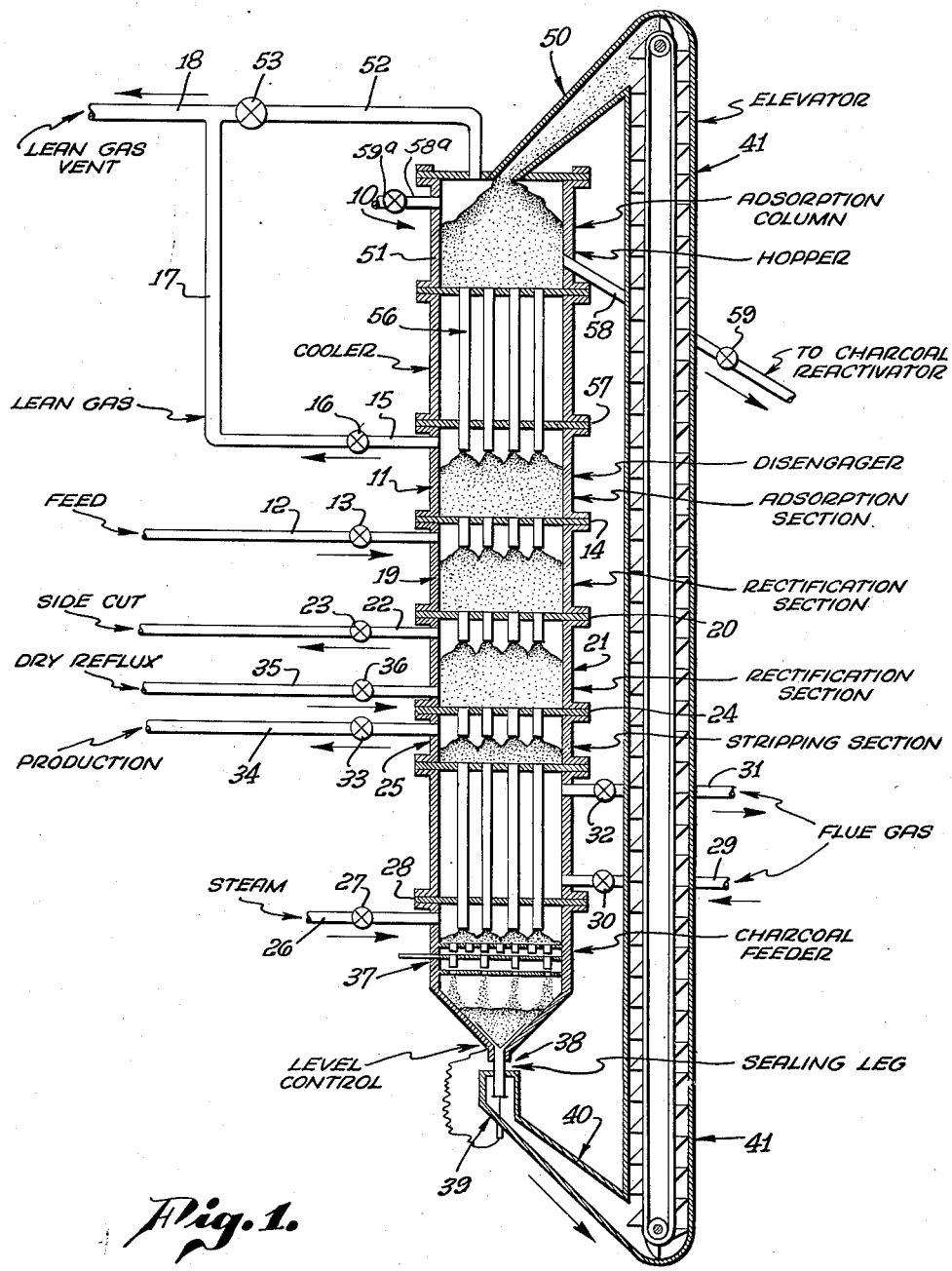

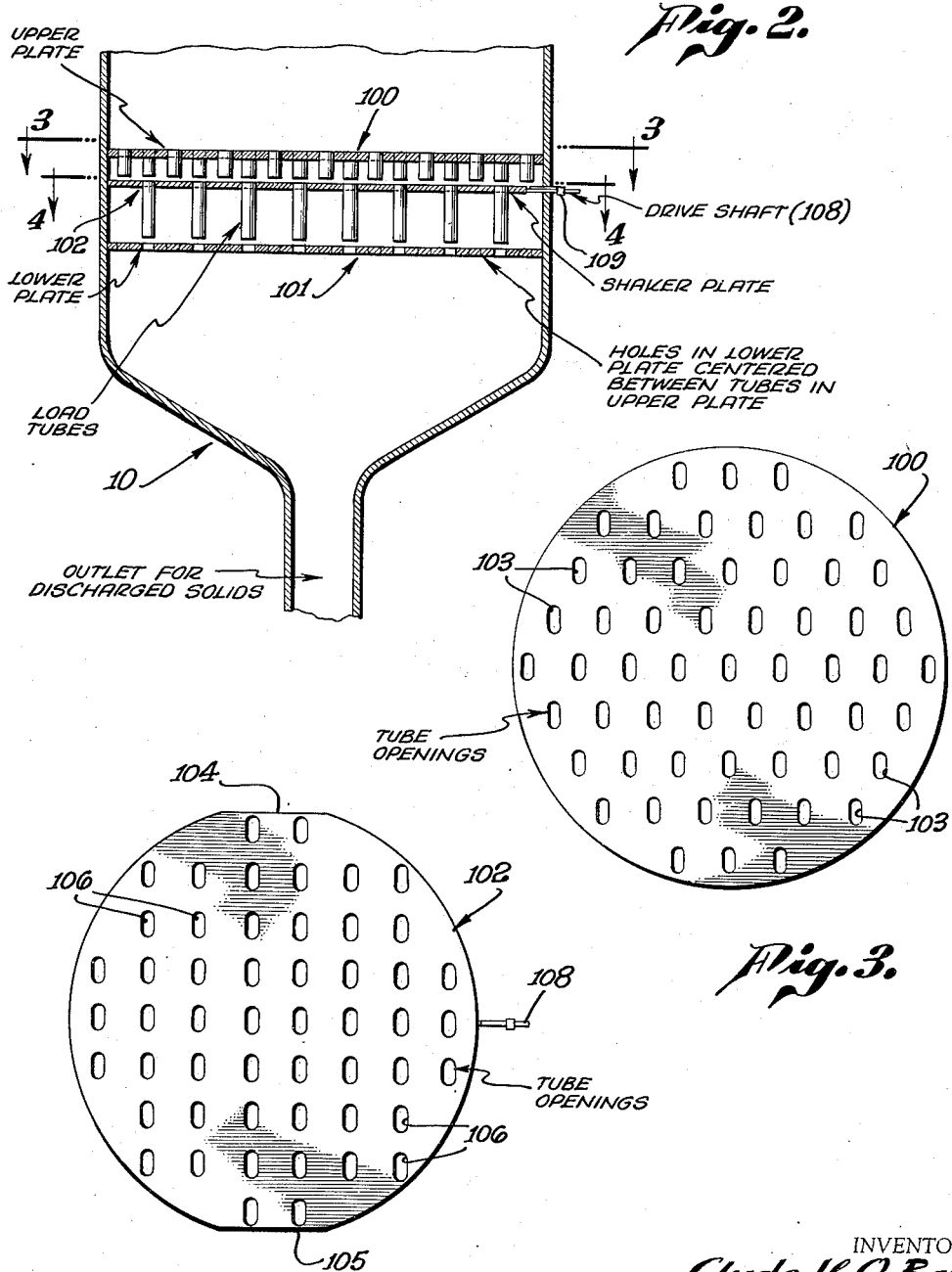

Patented Mar. 6, 1951

2,544,214

UNITED STATES PATENT OFFICE 2,544,214

APPARATUS FOR GAS SEPARATION BY ADSORPTION

Clyde H. O. Berg, Long Beach, Calif., assignor to Union Oil Company of California, Los Angeles, Calif., a corporation of California Application September 24, 1945, Serial No. 618,347

14 Claims. (Cl. 183—4.2)

1

This invention relates to the handling of granular or powdered solids and more particularly to the flow distribution, control and measurement of the rate of flow of granular solids in moving bed systems or in transportation of such solids by gas lift, elevators or the like.

It is the principal object of the invention to provide a method of accurately controlling and at the same time accurately metering the flow of powdered or granular solids, i. e., solids which are in a semifluid state either on a volumetric or a weight basis.

It is a further object of the invention to provide an apparatus for accomplishing the metered flow of granular solid materials which may be employed to give a wide flexibility of delivery rates such as from about zero to several thousand pounds per hour or higher with a high degree of accuracy and precision.

Other objects and advantages of my invention will become apparent to those skilled in the art as the description thereof proceeds.

In the utilization of moving beds of granular or powdered solid material such as for example as employed in many catalytic processes such as catalytic cracking, or the like, and in various other applications such as selective adsorption of liquids or gases on a moving bed of a solid granular adsorbent such as charcoal, silica gel, alumina, or the like, the problem of accurate control and measurement of the rate of flow of the catalyst or adsorbent through the reaction or adsorption column is encountered. Further, in various means of transportation or dispensing of solids it is desirable and in many cases essential to be able to predetermine and control the rate of flow of the solids or to accurately measure the quantity dispensed in a given time.

To these ends my invention is directed and in the foregoing and following description of my invention the term "granular solids" is intended to include normally solid materials which are in the form of powder or sufficiently small granules to permit a convenient transportation of such materials by means of gas lift, screw conveyors, elevators and the like. It is difficult to establish a maximum particle size which falls under this classification but granules of 20 mesh or smaller may be included therein as well as larger particles of from 20 mesh to an inch or greater.

The apparatus according to my invention consists essentially of three parallel perforated plates disposed vertically with relation to each other in such a manner that the flat surfaces of said plates are parallel, the upper and lower of said plates being fixed in a stationary position and the intermediate of said plates being capable of motion in a direction substantially parallel to the surface of the plate. This intermediate plate is caused to oscillate within the column or vessel in a well defined cycle by means of external driving force furnished for example by a drive shaft connecting with the plate and a driving motor on the outside of the column. This oscillation of the intermediate plate serves the function as hereinafter described of interrupting and controlling the flow of the granular solids through the upper and lower plates. In the preferred application of the apparatus, tubes of substantially the same diameter as the perforations in the plate are attached to the upper and intermediate plates in such a manner as to form extensions of the perforations. The placement of the perforations and tubes in all of these plates are so adjusted that a flow of granular or powdered material through perforations and tubes of the upper plate is interrupted by the surface of the intermediate plate with the exception of those perforations and tubes in the intermediate plate which coincide at the particular position of the intermediate plate with certain of the perforations and tubes in the upper plate. At any given position of the movable intermediate plate the direct flow of solids through the three plates is prevented so that in one position a portion of the tubes of the intermediate plate are filled with the granular or solid material by virtue of the coincidence of all or a portion of these tubes with the tubes of the upper plate. At the same time, however, flow through these tubes which are in the process of filling or have been filled is prevented by the surface of the lower plate until such time as the intermediate plate is moved at right angles to the direction of solid flow to a position at which the previously filled tubes in the intermediate plate coincide with the perforations of the lower plate. When all or a portion of the tubes in the intermediate plate coincide with the openings or perforations of the lower plate the solids in these tubes pass through the lower plate into the space beneath the lower plate while at the same time the flow of solids through the upper plate into the particular tubes which are unloading through the lower plate is prevented by the surface of the upper plate. Thus briefly the apparatus effects the alternate loading and unloading of at least a portion of the tubes extending downwardly from the perforations of the intermediate plate.

The apparatus will be described in more detail hereinafter.

The principles and advantages of my invention may be more readily understood by a description of the usage of the flow controlling apparatus in connection with the operation of a typical charcoal adsorption process utilizing a moving bed of charcoal which requires control of the rate of flow of the granular charcoal through the adsorption column. Such a charcoal adsorption plant and also the apparatus of the present invention are shown in the drawings. Figure 1 is a diagrammatic view of a charcoal adsorption column with the flow controller located in the lower portion thereof. Figure 2 is a cross sectional view of the lower portion of the column and the flow controller. Figures 3 and 4 are views on lines 3—3 and 4—4, respectively of Figure 2.

In the particular adsorption process as illustrated and described, it is possible to resolve a normally gaseous mixture containing various gaseous components of relatively high molecular weight or critical temperature, components of intermediate molecular weight or critical temperature and components of relatively low molecular weight or critical temperature into its corresponding fractions. Such a gaseous mixture is well illustrated for example by a normally gaseous hydrocarbon fraction comprising methane, $C_2$ hydrocarbons, and $C_3$ and $C_4$ hydrocarbons wherein, for the purposes of the following description, the methane is considered as a component of relatively low molecular weight, the $C_2$ hydrocarbons are considered as the components of the intermediate molecular weight and the $C_3$ and $C_4$ hydrocarbons are considered as the components of relatively high molecular weight. In the process as described, it is possible to resolve such a gaseous fraction into the three components in one adsorption column by obtaining a heart cut of the intermediate component as a side stream from the column.

Referring to Figure 1, feed gas is introduced to the adsorption section 11 of adsorption column 10 by means of line 12 controlled by valve 13 and is distributed within the adsorption section 11 by means of disengager 14. The disengagers may be any conventional type such as the tube sheets herein shown. A solid bed of granular charcoal is caused to flow downwardly through the adsorption column at such a rate that substantially all of the $C_2$ and heavier hydrocarbons are adsorbed in the charcoal in the adsorption section 11 while methane and lower boiling gases pass upwardly therein, a part of which are withdrawn from the adsorption section by means of line 15 controlled by valve 16 and pass through line 17 into the lean gas vent 18.

The saturated charcoal passes from adsorption section 11 through disengager 14 into rectification section 19 wherein equilibrium is established between the methane and lighter gases which may have been adsorbed and the $C_2$ and heavier hydrocarbons by refluxing the charcoal with $C_2$ hydrocarbons which are released from the charcoal at a point lower in the column. Thus in rectification section 19 any residual methane or lighter gases which may have been adsorbed by the charcoal passing downwardly through disengager 14 are desorbed by virtue of the selective adsorption of the $C_2$ hydrocarbons which are allowed to pass upwardly through disengaging section 20 into rectification section 19. The charcoal substantially free of such lighter components passes from rectification section 19 through disengaging section 20 into a secondary rectification section 21. In section 21 the charcoal is refluxed with the heavier components of the feed; i. e., $C_3$ and $C_4$ hydrocarbons to effect the desorption of the $C_2$ hydrocarbons, the level of $C_3$—$C_4$ reflux being controlled at a given point within the rectification section by means of a temperature control point within the section to measure the heat of adsorption of the $C_3$ and $C_4$ hydrocarbons and to control the reflux inlet valve. By injecting or otherwise introducing $C_3$ and $C_4$ hydrocarbons into the rectification section 21 to serve as reflux therein the $C_2$ hydrocarbons are desorbed due to the preferential adsorption of the heavier hydrocarbons and the desorbed $C_2$ hydrocarbons migrate upwardly in the section insuring thereby the continued retention of the heavier components on the charcoal flowing downwardly from rectification section 19. In this manner a $C_2$ heart cut may be withdrawn from the top of rectification section 21 by means of line 22 controlled by valve 23 which is comparatively free of either lighter or heavier components.

To further insure the production of a side cut containing a minimum of lighter components as impurities, valve 23 is so controlled that a portion of the $C_2$ hydrocarbons desorbed in rectification section 21 are forced to pass upwardly through disengaging section 20 into the intial rectification section 19 therein furnishing reflux as above described for the down flowing charcoal to insure a substantially complete removal of the methane and lighter gases.

The charcoal substantially free of $C_2$ hydrocarbons and lighter gases passes from rectification section 21 through disengager 24 into the steam stripping section 25. In this section steam is introduced by means of line 26 controlled by valve 27 at disengager 28 and flows upwardly through a fire heated tube bundle in the stripping sections. The tube bundle is heated by means of hot combustion gases or the like which are introduced by means of line 29, controlled by valve 30 and withdrawn from the tubular heater by means of line 31 controlled by valve 32. In this section the $C_3$ and heavier hydrocarbons and any residual $C_2$ or lighter gases which may still be adsorbed on the charcoal are stripped from the charcoal together with the steam and are withdrawn by means of line 33 controlled by valve 34. These $C_3$ and heavier hydrocarbons are dried by condensation of the steam and separation thereof from the hydrocarbons and are reintroduced in the adsorption column at a point in rectification section 21 directly above disengager 24 by means of line 35 controlled by valve 36 to serve therein as reflux.

In an alternative method of furnishing heavy hydrocarbon reflux to rectification section 21 the take-off valve 39 in line 33 may be so controlled as to force a portion of the products from the stripping section; i. e., steam and hydrocarbons, predominantly $C_3$ and $C_4$ hydrocarbons, countercurrently to the charcoal flow through disengager 24 into the rectification section. There are, however, certain inherent disadvantages to this what might be termed, "direct return reflux" paramount among which are the dilution of the hydrocarbons which give the most efficient refluxing action and moistening of the charcoal by a partial condensation of the steam which has the effect of impeding the free flow of the charcoal through the tubes in disengager 24 due to the tendency of the charcoal particles to adhere to each other or agglomerate when they become wet.

For these reasons I have found that decidedly improved results could be obtained by removing the entire production from the stripping section, thus preventing any substantial flow back through disengager 24, separating the stripping steam from the hydrocarbon gases and returning the latter as substantially dry reflux to the lower portion of rectification section 21. This dry reflux return as represented in the drawing by line 35 controlled by valve 36 may be effected in any desired manner such as by means of a spider located in the lower section of rectification section 21 slightly above the disengaging section 24 or by a separate disengaging section separated from disengaging section 24 by a distance sufficient to permit the build-up of a head of charcoal to prevent excessive leakage of the wet stripped gases from the stripping section through disengager 24. These particular methods of reintroduction of the dry reflux are only illustrative of possible modes of operation and should not be construed as limiting the present invention in any of its aspects.

The charcoal flowing through the disengaging section 24 passes through the stripping section 25 as described, through the combustion gas heated tube bundle into the lower portion of the adsorption column. It is at this point that the rate of flow of the charcoal through the column is most conveniently controlled and this control is effected by means of the apparatus according to the present invention illustrated as charcoal feeder 37. Detailed description of this apparatus will be given in connection with the description of Figures 2, 3 and 4, and it is therefore omitted in the present description of its utilization in a given process. In the drawing, a level control 39 is shown whereby the length of the sealing leg may be kept at a minimum by virtue of the fact that a build-up of charcoal can be induced in the bottom of the separator. The charcoal is released by the level control 39 flowing through transfer line 40 into the charcoal elevator 41.

The charcoal flowing through transfer line 40 is picked up by elevator 41 carried to the top of adsorption column and deposited in the transfer line 50 falling therefrom into hopper 51. A major portion of charcoal in hopper 51 passes through cooler 56 wherein it is cooled to the desired temperature before passing through disengager 57 into adsorption section 11. Line 58 controlled by valve 59 is provided whereby charcoal may be withdrawn from hopper 51 when desired to be reactivated for reuse in the process, and returned through charcoal introduction line 58a and valve 59a.

The charcoal in the adsorption column is further dried by controlling valve 16 on the lean gas drawoff line 15 from the adsorption section 11 so that a portion of the lean gas is forced to flow through the cooling tubes in cooler 56 countercurrently to the charcoal flow and through hopper 51 into lean gas exit 52. This description is of a modification of the conventional process of countercurrent selective adsorption on a solid moving bed adsorbent whereby it is possible to recover one or more side cuts consisting essentially of fractions enriched in certain components of the original feed stock. The value of this modified process with respect to efficiency of operation and elimination of excesive equipment which would be necessary to perform the same type of separation in conventional operation will be immediately obvious to those skilled in the art.

The charcoal employed in the above process is preferably granular, about 10 to 40 mesh, although sizes as large as about 4 mesh and as small as about 100 mesh may also be employed. By "charcoal" herein is meant activated carbon, animal or vegetable charcoal, and the like, although an activated form of carbon or charcoal is preferred. After long usage, small amounts of highly adsorbable materials may accumulate in the charcoal and impair its efficiency somewhat. The charcoal may then be withdrawn as provided in the attached Figure 1 by line 58 from hopper 51 and can usually be reactivated by high temperature roasting.

The degree of adsorbability of gases on charcoal is generally higher for the gases of higher molecular weight. There appears to be a rough correlation between adsorbability and critical temperature. Thus, gases of low critical temperature, such as hydrogen, nitrogen, oxygen and carbon monoxide are adsorbed to a lesser degree than gases of higher critical temperature, such as chlorine, sulfur dioxide, hydrogen sulfide, ammonia, nitrous oxide, carbon dioxide and the like. Among the hydrocarbons there is a marked increase in adsorbability with molecular weight. Thus, the process may be employed for the separation of hydrocarbon vapors of higher molecular weight from those of lower molecular weight, as in the adsorption of natural gasoline from natural gas. It may also be used for purification or concentration of readily adsorbable gases, such as those shown from mixtures in which they are contained.

The ratio of charcoal to feed gas required depends on the proportion of rich gas or highly adsorbable components in the feed and the degree of removal desired. As a possible explanation of its action, it appears that charcoal has a definite adsorptive capacity for each component of a gaseous mixture at a given temperature which capacity is affected only slightly by the total pressure and the concentration of the component in the mixture. When a given amount of fresh charcoal is contacted with feed gas, the charcoal adsorbs all components of the gas to at least a slight degree. Its capacity to adsorb the least readily adsorbable constituents of the gas is soon exceeded however, and thereafter it will not adsorb further amounts of these constituents, but will continue to adsorb the more readily adsorbable components. As it approaches its adsorptive capacity for each more readily adsorbable component, furthermore, there is a definite displacement of the less readily adsorbable material by the more readily adsorbable material. Thus, for a feed gas containing $C_1$ to $C_4$ hydrocarbons including butadiene, mixed with nitrogen, the use of a high ratio of charcoal to feed gas would result in more complete recovery of total hydrocarbons as make gas, and the use of a limited amount of charcoal would result in the production of a smaller amount of a make gas of higher $C_4$ hydrocarbon or butadiene content.

There are many modifications of the above process which may be employed. Although granular charcoal of about 10 to 40 mesh is preferred, larger granules up to about 2 mesh may be employed in some instances, and finely ground or powdered charcoal of about 500 mesh may also be employed. When using the powdered charcoal, however, much more care must be exercised in the design of sealing legs, separators, etc. The use of finely powdered charcoal lends itself well to concurrent flow of stripping gas and charcoal, which is another modification applicable also to granular charcoal. When concurrent flow of stripping gas and charcoal is employed, especially with finely ground charcoal, the stripping may be accomplished by lifting the charcoal to a separator located at the top of a cooler while heating it at the same time. In another modification, the stripping gas may be sufficiently preheated to supply the bulk or all of the necessary stripping heat.

Whereas, the general principle of my invention has been described and illustrated with respect to its utilization in the charcoal adsorption process it is not intended that such usage be considered as a limitation of my invention inasmuch as the feeder or controller as described herein may be employed in any operation wherein it is desirable to control or measure the flow of solids of granular form. For a more complete understanding of the elements of my invention reference is made to Figures 2, 3 and 4.

Figure 2 comprises a cross-sectional view of the feeding apparatus according to my invention in which the three parallel plates are located in a vessel 10 which may be any particular type such as may be employed in catalytic process, adsorption process, storage of solids or the like.

The upper plate 100 and the lower plate 101 are fixed in a stationary position within the column and occupy substantially the entire area of the column cross-section, the intermediate or shaker plate 102 is free of the walls of vessel 10 being of such a shape as to permit the movement of this plate in a direction at right angles to the flow of solids through the vessel 10. Each of these plates contain uniformly spaced holes, the diameter of which are dependent upon the particle size of the solid material to be fed and upon the desired rate of flow of this material. Generally the diameter of these openings should be at least five times the average diameter of the particles to be metered. Upper plate 100 and the shaker plate 102 are equipped with tubular extensions of the holes in the plates for the purpose of preventing the flow of solids when the holes in the upper and the shaker plate do not coincide, and further to permit the loading of a substantial quantity of the solid material in the tubes of the intermediate or shaker plate so as to obtain a substantial flow rate. The length of the tubular extensions of the holes in the shaker plate is a function of the desired rate of flow of the granular solid material inasmuch as the longer these tubes the greater quantity of solids which will flow therein from the upper plate 100 and consequently the greater volume of solids which will be discharged, upon movement of the shaker plate, through the holes in the lower plate 101. The location of the holes in the upper plate 100 is shown in Figure 3 which is a view on line 3—3 of Figure 2. These holes are spaced so as to be substantially centered in equal area portions of the upper plate and the lower plate 101 possesses the same number of holes spaced intermediate and essentially half way between the holes of the upper plate. The configuration of the shaker plate is shown in Figure 4 which is a view on line 4—4 of Figure 2 of the plate showing the shape with the flattened ends 104 and 105 and the decreased diameter in the direction opposite ends 104 and 105 which features are necessary to permit the oscillation of the plate within the column. Holes 106 in the shaker plate are so placed that when half thereof coincide with the holes of the upper plate, the other half will coincide with the holes of the lower plate in one position of the cycle. Those holes coinciding with the tubes of the upper plate will be in a position to fill with granular material, whereas, those holes coinciding with the holes in the lower plate will be discharging the granular material received through the upper plate in the opposite phase of the cycle. Flow of granular material from the tubes in the upper plate into those tubes of the lower plate which are not in coincidence therewith is prevented by the small tolerance between the lower end of the tubes of the upper plate 100 and the surface of the shaker plate 102, allowable tolerance being a function of the normal angle of repose of the particular form of the solid to be metered. In a similar manner the flow of the granular solid from those tubes of the shaker plate which are in the process of filling through the holes in the bottom plate which are not in coincidence thereto is prevented by the small tolerance between the lower ends of the tubes of shaker plate 102 and the surface of the lower plate 101. In general I have found that it is undesirable to operate with too small a space between the surface of one plate and the point of discharge from the plate directly above. This precaution has the effect of reducing the attrition of the solid granules which occurs if the oscillating center plate is too close to the lower surface of the upper plate or to the lower openings of the tubes attached to the upper plate and also if the lower surface of or tubes attached to the intermediate plate are too close to the upper surface of the lower plate. I have found that it is preferable to provide a tolerance between these surfaces of at least twice the average diameter of the particles to be metered.

Shaker plate 102 is oscillated in a direction substantially parallel to the surface of the plate by means of drive shaft 108 passing through the column wall at packing gland 109 shown in Figure 2. This drive shaft may be operated by hand or by means of a suitable motor connected to the drive shaft by means of a concentric.

Placement of the holes in the three plates as described is not intended to limit my invention inasmuch as many modifications thereof may be employed providing that those tubes of shaker plate 102 which are in the process of loading by means of flow through coinciding holes in upper plate 100 do not at the same time coincide with the discharge holes in the lower plate 101 and conversely those tubes of shaker plate 102 which are discharging through coinciding holes in the lower plate 101 do not coincide with the feed holes in upper plate 100. Thus the openings in these plates may be so arranged relative to each other that all of the tubes in shaker plate 102 are filling in one phase of the cycle and discharging in the opposite phase of the cycle and alternatively the arrangement may be such that a portion of the tubes in shaker plate 102 are filling at the same time that a portion of the tubes are discharging.

Whereas it is not necessary that tubes be attached to the upper plate 100, it is preferable in those cases where granular rather than powdered material is to be metered inasmuch as the movement of shaker 102 in close juxtaposition to the upper plate 100 has the undesirable effect of grinding the granular material, which effect may be substantially eliminated by the usage of short tubular openings in the upper plate 100. This problem is minimized in those cases in which powdered material and particularly very finely powdered material is metered and in such cases the uses of tubular openings in the upper plate is not necessary.

The practical limitations of the apparatus in respect to the quantity of flow possible are a function of the number of holes or openings in each plate, of the diameter of these holes, of the length of the tubes of shaker plate 102 and of the number of oscillations per unit of time of the shaker plate. Each of these variables have certain practical limitations which, however, may be adjusted with respect to each other to permit almost any desired flow rate. Thus the number of cycles of oscillation of the shaker plate may range from 1 to 250 per hour or higher, but preferably not in excess of about 360 per hour. Further the number of openings of a given diameter in the plates are limited by the normal angle of repose of the particular form of the solid material to be metered, inasmuch as it is necessary that the openings of the plates which are not in coincidence with respect to each other are sufficiently far apart to prevent substantial leakage of the solid material from one to the other. Therefore the diameter and number of the openings in the plate are interdependent, i. e., the larger the diameter the smaller the number of possible openings and conversely the smaller the diameter the greater the number of possible openings. Thus the number of openings will be indirectly controlled by the shape of the material to be metered inasmuch as upon an increase of the particle size of the material the diameter of the opening will of necessity be increased to permit unimpeded flow through the proper tubes and such an increase in the diameter will reduce the number of openings permissible. The capacity of the feeder can be further varied by a variation in the length of the tubes of shaker plate 102 this length being limited primarily by the desired number of oscillations of this shaker plate, the rate of oscillation controlling the amount of fill and discharge possible from these tubes. Thus the slower the oscillation the longer will be the filling or discharge time and consequently the longer will be the permissible length of the tubes in the shaker plate. No established limitations can be predicated for any of these variables inasmuch as their selection will be a function of the type and form of the granular solid material which is to be metered.

In respect to oscillation of the shaker plate 102, it is preferable not to employ simple harmonic motion but rather an intermittent motion whereby the cycle is interrupted temporarily at the points of filling and discharging to permit a greater unit capacity.

The wide range of flow through the metering unit as described may be readily appreciated by a specific example in which such a unit was employed to control the rate of flow of a 20 to 40 mesh activated charcoal in a charcoal adsorption plant substantially the same as that shown in Figure 1. The metering unit employed was of an overall diameter of 1 foot 8 inches and each plate contained 57 openings of one inch diameter spaced in such a manner that at one phase of the cycle half of the tubes of the shaker plate were loading while the other half were unloading. This unit when operated from 1 to 250 cycles per hour was capable of delivering from 3 to 750 pounds of charcoal per hour from shaker tubes of 4 inches in length.

The shape of the openings in these plates is not an essential element of my invention and may vary from circular to rectangular or the like, but are preferably elongated in a direction at right angles to the direction of motion of the shaker plate whereby a greater volume of flow may be obtained without sacrifice of accuracy.

Many modifications in the particular apparatus which may be designed with the intention of utilizing the principles of my invention will occur to those skilled in the art without departing from the spirit or scope of the invention which comprises essentially the accurate control and metering of granular solids by means of automatically measured flow by alternate filling and emptying at a predetermined rate of tubular receptacles with the granular solid material.

Having described and illustrated my invention with reference primarily to the principle thereof and the apparatus for the accomplishment of these principles and secondarily to the particular modes of utilization of this apparatus, I claim:

1. An apparatus for the control and metering of the flow of granular solid materials which comprises a tubular section of substantially uniform cross-section, three vertically disposed plates contained in said tubular section, the surfaces of said plates being substantially parallel to each other and at right angles to the flow of said granular solids through said tubular section, the peripheries of the upper and lower of said plates being substantially in complete contact with, and affixed to, the walls of said tubular section, the intermediate of said plates being free to move in a direction of right angles to the flow of said granular solids through said tubular section for a distance of not more than ¼ of the diameter of said tubular section in either direction from a central position, said intermediate plate having a drive shaft affixed thereto which projects through the wall of said tubular section and by means of which said intermediate plate may be caused to oscillate within said tubular section, said upper, lower and intermediate plates containing numerous, substantially equally spaced openings through which said granular solid may flow, said openings being distributed over substantially the entire areas of said plates and being spaced in each plate with respect to the openings in each other plate in such a manner that the granular solids must flow through openings in all three of said plates in order to pass through said tubular section and at the same time may not pass through more than two of said plates at any one position of the movable intermediate plate, and said plates being so spaced that the tolerance between the point of discharge from one opening and the surface of the next succeeding plate is at least twice the average diameter of the particles to be metered.

2. An apparatus according to claim 1 in which the upper and intermediate plates possess tubular projections of the openings therein through which said granular solids must flow.

3. An apparatus according to claim 1 in which the plate openings are of a diameter of at least five times the average diameter of particles to be metered.

4. In an apparatus for the separation of a gaseous mixture which comprises an adsorption zone, means for passing granular charcoal through said adsorption zone, means for introducing said gaseous mixture into said adsorption zone so as to adsorb the more readily adsorbable components on said charcoal, means for separating the thus enriched charcoal from the unadsorbed components of said gaseous mixture, means for stripping the adsorbed components from said enriched charcoal in a stripping zone by heating said enriched charcoal moving continuously downward in a solid stream through which a counter-current stream of stripping gas is being passed, and means for conveying said stripped charcoal from said stripping zone to said adsorption zone, the improvement comprising means for controlling the flow of charcoal through the adsorption column by an apparatus comprising a tubular section below said stripping zone, having substantially the same cross-section as said stripping section; three vertically disposed plates contained in said tubular section, the surfaces of said plates being substantially parallel to each other and at right angles to the flow of said granular charcoal through said tubular section, the peripheries of the upper and lower of said plates being substantially in complete contact with, and affixed to, the walls of said tubular section, the intermediate of said plates being free to move in a direction at right angles to the flow of said charcoal through said tubular section for a distance of not more than ¼ of the diameter of said tubular section in either direction from a central position, said intermediate plate having a drive shaft affixed thereto which projects through the wall of said tubular section and by means of which said intermediate plate may be caused to oscillate within said tubular section, said upper, lower and intermediate plates containing numerous, substantially equally spaced openings through which said charcoal may flow, said openings being distributed over substantially the entire areas of said plates and being spaced in each plate with respect to the openings in each other plate in such a manner that the said charcoal must flow through the openings in all three of said plates in order to pass through said tubular section and at the same time may not pass through more than two of said plates at any one position of the movable intermediate plate.

5. An apparatus according to claim 4 in which the upper and intermediate plates possess tubular projections of the openings therein through which said adsorbent must flow.

6. An apparatus according to claim 4 in which the tolerance between the point of discharge from one opening and the surface of the next succeeding plate is at least twice the average diameter of the particles to be metered.

7. An apparatus according to claim 4 in which the plate openings are of a diameter of at least five times the average diameter of the particles of solids to be metered.

8. An apparatus process according to claim 4 in which the plate openings are elongated in a direction at right angles to the direction of motion of the shaker plate and are substantially in cross-section the shape of a rectangle with curved ends.

9. In an apparatus process for the separation of a gaseous mixture which comprises an adsorption column containing an adsorption section, a rectification section and a stripping section, means for passing a granular adsorbent in a solid moving bed downwardly from section to section, means for introducing said gaseous mixture into adsorption section so as to adsorb the more readily adsorbable components on said adsorbent, means for separating the thus enriched adsorbent from the unadsorbed components of said gaseous mixture, means for desorbing a portion of the adsorbed components from said enriched adsorbent in said rectification section by contacting said enriched adsorbent with further quantities of the more readily adsorbable components of said gas mixture, means for withdrawing said desorbed portion of said gaseous mixture, means for stripping the remaining adsorbed components from said enriched adsorbent in said stripping section by heating said enriched adsorbent moving continuously downward while passing a countercurrent stream of stripping gas therethrough, and means for conveying said stripped adsorbent from the bottom of said adsorption column to the top thereof, the improvement comprising means for controlling the flow of adsorbent through the adsorption column by means of an apparatus for the control and metering of the flow of said granular adsorbent which comprises a tubular section below said stripping section having substantially the same cross-section as said adsorption, rectification, and stripping sections, three vertically disposed plates contained in said tubular section, the surfaces of said plates being substantially parallel to each other and at right angles to the flow of said adsorbent through said tubular section, the peripheries of the upper and lower of said plates being substantially in complete contact with, and affixed to, the walls of said tubular section, the intermediate of said plates being free to move in a direction of right angles to the flow of said adsorbent through said tubular section for a distance of not more than ¼ of the diameter of said tubular section in either direction from a central position, said intermediate plate having a drive shaft affixed thereto which projects through the wall of said tubular section and by means of which said intermediate plate may be caused to oscillate within said tubular section, said upper, lower and intermediate plates containing numerous, substantially equally spaced openings through which said adsorbent may flow, said openings being distributed over substantially the entire areas of said plates and being spaced in each plate with respect to the openings of each other plate in such a manner that the adsorbent must flow through the openings in all three of said plates in order to pass through the apparatus and at the same time may not pass through more than two of said plates at any one position of the movable intermediate plate.

10. An apparatus according to claim 9 in which the adsorbent is charcoal.

11. An apparatus for the separation of a gaseous mixture by selective adsorption on a solid adsorbent which comprises a column containing an adsorption section and a stripping section, means for passing said granular adsorbent in a solid moving bed downward from section to section, means for introducing said gaseous mixture into said adsorption section, means for removing unadsorbed gases from said adsorption section, means for stripping adsorbed gases from said adsorbent in said stripping section, means for removing said stripped gases from said stripping section, means for lifting said adsorbent from the bottom of said column to the top thereof, and means for controlling the flow distribution and flow rate of said solid moving bed of adsorbent in said column at a single point within said column, said means comprising a tubular section below said stripping section, having substantially the same cross-section as said stripping section, three vertically disposed plates contained in said tubular section, the surfaces of said plates being substantially parallel to each other and at right angles to the flow of said granular adsorbent through said tubular section, the peripheries of the upper and lower of said plates being substantially in complete contact with, and affixed to, the walls of said tubular section, the intermediate of said plates being free to move in a direction at right angles to the flow of said adsorbent through said tubular section and having a drive shaft affixed thereto which projects through the well of said tubular section and by means of which said intermediate plate may be caused to oscillate within said tubular section, said upper, lower and intermediate plates containing numerous, substantially equally spaced openings through which said adsorbent may flow, said openings being distributed over substantially the entire areas of said plates and being spaced in each plate with respect to the openings in each other plate in such a manner that the said adsorbent must flow through the openings in all three of said plates in order to pass through said tubular section and at the same time may not pass through more than two of said plates at any one position of the movable intermediate plate.

12. An apparatus according to claim 11 in which the upper and intermediate plates have tubular projections of the openings therein, there is a tolerance between the point of discharge from one opening and the surface of the next succeeding plate, the openings are so arranged that approximately one-half of the tubular projections in the movable plate will be filling while the other half is discharging, and said tolerance is limited by the normal angle of repose of said adsorbent but is at least about twice the average diameter of the adsorbent particles.

13. An apparatus according to claim 11 in which the adsorbent is charcoal.

14. An apparatus for the control and metering of the flow of granular solid materials which comprises a tubular section of substantially uniform cross-section, three vertically disposed plates contained in said tubular section, the surfaces of said plates being substantially parallel to each other and at right angles to the flow of said granular solids through said tubular section, the peripheries of the upper and lower of said plates being substantially in complete contact with, and affixed to, the walls of said tubular section, the intermediate of said plates being free to move in a direction of right angles to the flow of said granular solids through said tubular section for a distance of not more than ¼ of the diameter of said tubular section in either direction from a central position, said intermediate plate having a drive shaft affixed thereto which projects through the wall of said tubular section and by means of which said intermediate plate may be caused to oscillate within said tubular section, said upper, lower and intermediate plates containing numerous, substantially equally spaced openings through which said granular solid may flow, said openings being distributed over substantially the entire areas of said plates and being spaced in each plate with respect to the openings in each other plate in such a manner that the granular solids must flow through openings in all three of said plates in order to pass through said tubular section and at the same time may not pass through more than two of said plates at any one position of the movable intermediate plate, and said openings also being elongated in a direction at right angles to the direction of motion of the shaker plate and being substantially in cross-section the shape of a rectangle with curved ends.

CLYDE H. O. BERG.

REFERENCES CITED

The following references are of record in the file of this patent:

UNITED STATES PATENTS

| Number | Name | Date |
| --- | --- | --- |
| 16,597 | Landes | Feb. 10, 1857 |
| 1,343,924 | McCorkle | June 22, 1920 |
| 1,422,007 | Soddy | July 4, 1922 |
| 1,825,707 | Wagner | Oct. 6, 1931 |